United States Patent [19]

Eguchi et al.

[11] Patent Number: 5,260,257
[45] Date of Patent: Nov. 9, 1993

[54] THERMAL TRANSFER SHEET

[75] Inventors: Hiroshi Eguchi; Koumei Kafuku; Masayuki Nakamura, all of Tokyo, Japan

[73] Assignee: Dai Nippon Printing Co., Ltd., Japan

[21] Appl. No.: 841,640

[22] Filed: Feb. 27, 1992

[30] Foreign Application Priority Data

Mar. 1, 1991 [JP] Japan .................... 3-57705
Mar. 1, 1991 [JP] Japan .................... 3-57706
Mar. 1, 1991 [JP] Japan .................... 3-57707

[51] Int. Cl.$^5$ .............. B41M 5/035; B41M 5/38
[52] U.S. Cl. ............................. 503/227; 428/195; 428/913; 428/914
[58] Field of Search ............ 8/471; 428/195, 913, 428/914; 503/227

[56] References Cited

U.S. PATENT DOCUMENTS 4,990,484 2/1991 Nakamura .................... 503/227

Primary Examiner—B. Hamilton Hess
Attorney, Agent, or Firm—Parkhurst, Wendel & Rossi

[57] ABSTRACT

A thermal transfer sheet including a substrate sheet and a dye supporting layer formed on one surface of said substrate sheet, characterized in that the dye contained in said dye supporting layer is represented by the following general formula

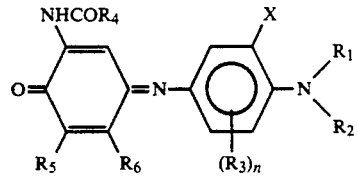

wherein $R_1$ stands for a substituted or unsubstituted alkyl group, cycloalkyl group, aralkyl group or aryl group or an atom or atom group which combines with X to form a five- or six-membered ring; $R_2$ stands for a substituted or unsubstituted alkyl group, a cycloalkyl group, an aralkyl group or an aryl group, provided that $R_1$ and $R_2$ may combine with each other to form a five- or six-membered ring which may have an oxygen or nitrogen atom; $R_3$ stands for a hydrogen atom, a halogen atom, a cyano group, a substituted or unsubstituted alkyl group, cycloalkyl group, alkoxy group, aralkyl group, aryl group, acyl group, acylamino group, sulfonylamino group, ureido group, carbamoyl group, sulfamoyl group or amino group; $R_4$ stands for a substituted or unsubstituted three- to five-membered cycloalkyl group or thienyl group bonded at the $\beta$-position, or a substituted or unsubstituted five- or six-membered cycloalkenyl group, or a group represented by the following formula

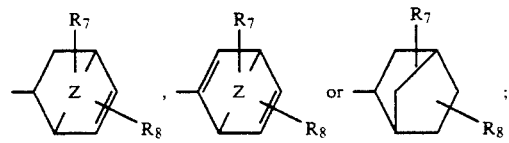

$R_5$ and $R_6$ which may be the same or different stand for a hydrogen atom, a halogen atom, a substituted or unsubstituted alkyl group, alkoxy group, acylamino group, sulfonylamino group or ureido group; X stands for a hydrogen atom or an atom or atom group which combines with $R_1$ to form a five- or six-membered ring; n is 1 or 2; $R_7$ and $R_8$ stand for a hydrogen atom, a halogen atom or a lower alkyl group; Z stand for $CH_2$, O, S or $NR_9$; and $R_9$ stands for a hydrogen atom or a lower alkyl group.

3 Claims, No Drawings

THERMAL TRANSFER SHEET

BACKGROUND OF THE INVENTION

The present invention relates to a thermal transfer sheet. More particularly, an object of the present invention is to provide a thermal transfer sheet having a cyan color capable of forming a record image excellent in the transferability, color density, sharpness and various types of fastness, particularly dye migration resistance and light fastness.

Various thermal transfer processes are known in the art. Among them, a sublimation transfer process has been practiced which comprises supporting a sublimable dye as a recording agent on a substrate sheet, such as paper, to form a thermal transfer sheet, putting the thermal transfer sheet on a transfer material dyeable with a sublimable dye, for example, a polyester woven fabric, and applying a thermal energy in a pattern form from the back surface of the thermal transfer sheet to transfer the sublimable dye to the transfer material.

In recent years, a proposal has been made on a process wherein various full color images are formed on paper or a plastic film through the use of the above-described sublimation type or thermal transfer system. In this case, a thermal head of a printer is used as heating means, and a number of color dots of three or four colors are transferred to the transfer material, thereby reproducing a full color image of an original by means of the multicolor dots.

Since the color material used is a dye, the image thus formed is very clear and highly transparent, so that the resultant image is excellent in the reproducibility and gradation and the quality of the image is the same as that of an image formed by the conventional offset printing and gravure printing. In this method, it is possible to form an image having a high quality comparable to a full color photographic image.

The most important problem in the thermal transfer process, however, resides in the color density, dye migration resistance and light fastness of the formed image.

Specifically, in the case of high-speed recording, the thermal energy should be applied in a very short period of time on the order of seconds or less, and since the sublimable dye and transfer material are not sufficiently heated in such a short time, an image having a sufficient density can not be formed.

For this reason, in order to cope with the above-described high-speed recording, a sublimable dye having an excellent sublimableness has been developed. Since, however, the molecular weight of a dye having an excellent sublimableness is generally small, the dye migrates in the transfer material or bleeds on the surface thereof with the elapse of time. This gives rise to problems with respect to dye migration resistance and light fastness derived from a small molecular weight, so that the formed image becomes disturbed or unclear or contaminates neighboring articles.

When a sublimable dye having a relatively high molecular weight is used for the purpose of avoiding the above-described problems, in the high-speed recording process, the sublimation rate is so poor that a satisfactory image can not be formed as with the above-described method.

SUMMARY OF THE INVENTION

Accordingly, an object of the present invention is to provide a thermal transfer sheet which, in a thermal transfer process wherein use is made of a sublimable dye, can provide a clear image having a sufficient density, the formed image being excellent in various types of fastness, particularly in the dye migration resistance after printing and light fastness.

The above-described object can be attained by the present invention. Specifically, according to the first aspect of the present invention, there is provided a thermal transfer sheet comprising a substrate sheet and a dye supporting layer formed on one surface of said substrate sheet, characterized in that the dye contained in said dye supporting layer is represented by the following general formula (I)

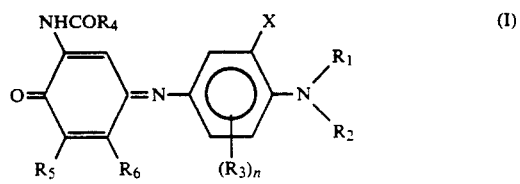

(I)

wherein $R_1$ stands for a substituted or unsubstituted alkyl group, cycloalkyl group, aralkyl group or aryl group or an atom or atom group which combines with X to form a five- or six-membered ring; $R_2$ stands for a substituted or unsubstituted alkyl group, a cycloalkyl group, an aralkyl group or an aryl group, provided that $R_1$ and $R_2$ may combine with each other to form a five- or six-membered ring which may have an oxygen or nitrogen atom; $R_3$ stands for a hydrogen atom, a halogen atom, a cyano group, a substituted or unsubstituted alkyl group, cycloalkyl group, alkoxy group, aralkyl group, aryl group, acyl group, acylamino group, sulfonylamino group, ureido group, carbamoyl group, sulfamoyl group or amino group; $R_4$ stands for a substituted or unsubstituted three- to five-membered cycloalkyl group or thienyl group bonded at the $\beta$-position; $R_5$ and $R_6$ which may be the same or different stand for a hydrogen atom, a halogen atom, a substituted or unsubstituted alkyl group, alkoxy group, acylamino group, sulfonylamino group or ureido group; X stands for a hydrogen atom or an atom or atom group which combines with $R_1$ to form a five- or six-membered ring; and n is 1 or 2.

According to the second aspect of the present invention, there is provided a thermal transfer sheet characterized in that the dye contained in said dye supporting layer is represented by the following general formula (II)

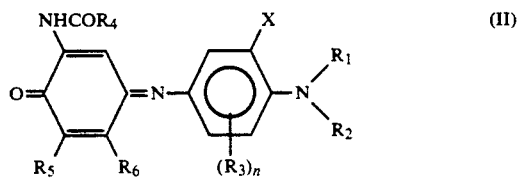

(II)

wherein $R_1$ stands for a substituted or unsubstituted alkyl group, cycloalkyl group, aralkyl group or aryl group or an atom or atom group which combines with X to form a five- or six-membered ring; $R_2$ stands for a substituted or unsubstituted alkyl group, a cycloalkyl group, an aralkyl group or an aryl group, provided that $R_1$ and $R_2$ may combine with each other to form a five- or six-membered ring which may have an oxygen or nitrogen atom; $R_3$ stands for a hydrogen atom, a halogen atom, a cyano group, a substituted or unsubstituted alkyl group, cycloalkyl group, alkoxy group, aralkyl group, aryl group, acyl group, acylamino group, sulfonylamino group, ureido group, carbamoyl group, sulfamoyl group, or amino group; $R_4$ stands for a substituted or unsubstituted five- or six-membered cycloalkenyl group; $R_5$ and $R_6$ which may be the same or different stand for a hydrogen atom, a halogen atom, a substituted or unsubstituted alkyl group, alkoxy group, acylamino group, sulfonylamino group or ureido group; X stands for a hydrogen atom or an atom or atom group which combines with $R_1$ to form a five- or six-membered ring; and n is 1 or 2.

According to the third aspect of the present invention, there is provided a thermal transfer sheet characterized in that the dye contained in said dye supporting layer is represented by the following general formula (III)

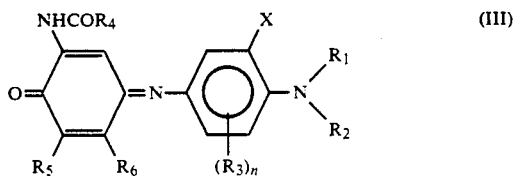

wherein $R_1$ stands for a substituted or unsubstituted alkyl group, cycloalkyl group, aralkyl group or aryl group or an atom or atom group which combines with X to form a five- or six-membered ring; $R_2$ stands for a substituted or unsubstituted alkyl group, a cycloalkyl group, an aralkyl group or an aryl group, provided that $R_1$ and $R_2$ may combine with each other to form a five- or six-membered ring which may have an oxygen or nitrogen atom; $R_3$ stands for a hydrogen atom, a halogen atom, a cyano group, a substituted or unsubstituted alkyl group, cycloalkyl group, alkoxy group, aralkyl group, aryl group, acyl group, acylamino group, sulfonylamino group, ureido group, carbamoyl group, sulfamoyl group or amino group; $R_4$ stands for a group represented by the following formula

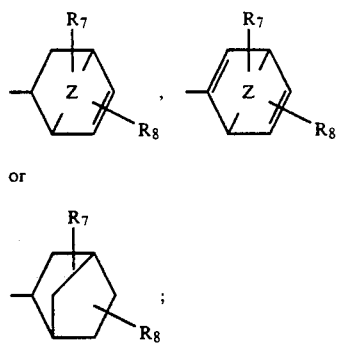

$R_5$ and $R_6$ which may be the same or different stand for a hydrogen atom, a halogen atom, a substituted or unsubstituted alkyl group, alkoxy group, acylamino group, sulfonylamino group or ureido group; X stands for a hydrogen atom or an atom or atom group which combines with $R_1$ to form a five- or six-membered ring; n is 1 or 2; $R_7$ and $R_8$ stand for a hydrogen atom, a halogen atom or a lower alkyl group; Z stand for $CH_2$, O, S or $NR_9$; and $R_9$ stands for a hydrogen atom or a lower alkyl group.

According to the present invention, the use of a dye having a particular structure enables the dye used to easily migrate to a transfer material upon being exposed to a heat energy even in a short time, so that it becomes possible to provide a thermal transfer sheet capable of providing a recorded image having a high density and excellent various types of fastness, particularly excellent dye migration resistance and light fastness.

DETAILED DESCRIPTION OF THE INVENTION

The dye represented by the general formula (I) used in the present invention can be easily produced by a conventional process, for example, by coupling a compound represented by the following general formula (2) with a p-phenylenediamine derivative represented by the general formula (3) in the presence of an oxidizing agent, such as silver chloride, ammonium persulfate or red prussiate, under an alkaline condition. The compound represented by the general formula (2) can be easily synthesized, for example, by subjecting an aminophenol compound represented by the general formula (4) and a carboxylic acid hydrochloride compound represented by the general formula (5) to dehydrochlorination condensation.

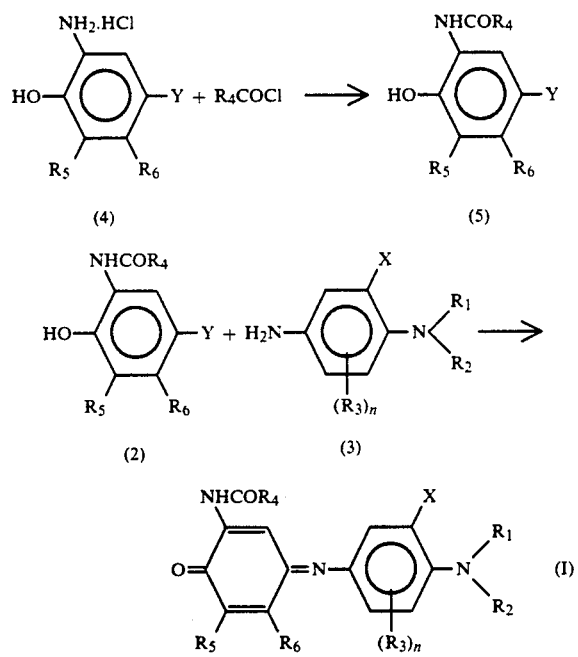

wherein $R_1$ to $R_6$, X and n are defined above and Y stands for a hydrogen atom or a halogen atom.

Preferred examples of the substituents represented by $R_1$ to $R_6$ in the general formula (I) include alkyl groups such as a methyl group, an ethyl group, a propyl group and a butyl group; alkoxyalkyl groups such as a methoxyethyl group and an ethoxyethyl group; hydroxyalkyl groups such as a hydroxyethyl group and a β-hydroxypropyl group; halogenoalkyl groups such as a chloroethyl group; cyanoalkyl groups such as a cyanomethyl group and a cyanoethyl group; cycloalkyl groups such as a cyclohexyl group; aralkyl groups such as a benzyl group and a phenetyl group; aryl groups such as a phenyl group, a tolyl group, a halogenophenyl group and an alkoxyphenyl group; a hydrogen atom; halogen atoms such as chlorine, bromine and iodine; a cyano group; alkoxy groups such as a methoxy group, an ethoxy group, a propoxy group and a butoxy group; acyl groups such as an acetyl group, a propanoyl group and a benzoyl group; acylamino groups such as an acetylamino group and a benzoylamino group; sulfonylamino groups such as a methanesulfonylamino group, an ethanesulfonylamino group and a benzenesulfonylamino group; ureido groups such as a methylureido group, a 1,3-dimethylureido group and an ethylureido group; carbamoyl groups such as a methylcarbamoyl group, an ethylcarbamoyl group and a phenylcarbamoyl group; sulfamoyl groups such as a methylsulfamoyl group, an ethylsulfamoyl group and a phenylsulfamoyl group; and amino groups such as a methylamino group, an ethylamino group, a propylamino group, a dimethylamino group and a diethylamino group.

Specific preferred examples of the dye represented by the general formula (I) in the present invention are listed in the following Table A1. In the formulae, each $R_1$ stands for an ethyl group, each X stands for a hydrogen atom and each n is 1 except for n in No. 16 which is 2.

conventional method, for example, by coupling a compound represented by the general formula (2) with a p-phenylenediamine derivative represented by the general formula (3) in the presence of an oxidizing agent, such as silver chloride, ammonium persulfate or red prussiate, under an alkaline condition. The compound represented by the general formula (2) can be easily produced by a conventional method, for example, by subjecting an aminophenol compound represented by the general formula (4) and a carboxylic acid chloride compound represented by the general formula (5) to dehydrochlorination condensation.

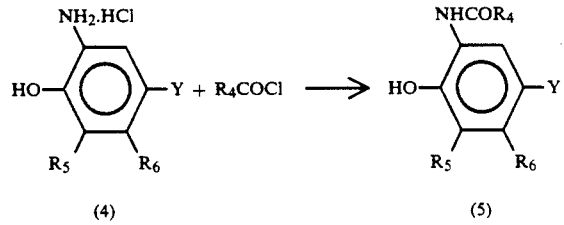

(4)    (5)

TABLE A1

| No. | $R_2$ | $R_3$ (position) | $R_4$ | $R_5$ | $R_6$ |
|---|---|---|---|---|---|
| 1 | —$C_2H_5$ | —$CH_3$ (2') | *1 | —Cl | —$CH_3$ |
| 2 | —$C_2H_4OH$ | —$CH_3$ (2') | *1 | —Cl | —$CH_3$ |
| 3 | —$C_2H_5$ | —$CH_3$ (2') | *1 | —H | —$NHCOCH_3$ |
| 4 | —$C_2H_5$ | —$OC_2H_5$ (2') | *1 | —H | —H |
| 5 | —$CH_2Ph$ | —$OC_2H_5$ (2') | *1 | —H | —$NHCOCH_3$ |
| 6 | —$C_2H_4NHSO_2CH_3$ | —$CH_3$ (2') | *1 | —H | —$NHCOCH_3$ |
| 7 | —$C_2H_4CN$ | —$NHCOCH_3$ (2') | *1 | —H | —$NHSO_2CH_3$ |
| 8 | —Ph | —Cl (2') | *1 | —Cl | —$CH_3$ |
| 9 | —$C_2H_5$ | —$NHCOCH_3$ (2') | *1 | —H | —H |
| 10 | —$C_2H_4OH$ | —$NHSO_2CH_3$ (2') | *1 | —H | —$NHCOCH_3$ |
| 11 | —$C_2H_5$ | —H | *1 | —Cl | —$CH_3$ |
| 12 | —$C_2H_5$ | —$CH_3$ (2') | *2 | —Cl | —$CH_3$ |
| 13 | —$CH_2Ph$ | —$CH_3$ (2') | *3 | —H | —$NHCOCH_3$ |
| 14 | —$C_2H_5$ | —$NHCOCH_3$ (2') | *3 | —Cl | —$CH_3$ |
| 15 | —$C_2H_5$ | —$CH_3$ (2') | *3 | —Cl | —$CH_3$ |
| 16 | —$C_2H_5$ | —$OC_5H_5$ (2', 5') | *3 | —H | —$NHCONHCH_3$ |
| 17 | —$C_2H_5$ | —H | *3 | —Cl | —$CH_3$ |
| 18 | —$C_2H_4Cl$ | —$NHCONHCH_3$ (2') | *3 | —H | —$NHCOCH_3$ |
| 19 | —$C_2H_5$ | —$CH_3$ (2') | *4 | —Cl | —$CH_3$ |
| 20 | —$C_2H_5$ | —$NHCOCH_3$ (2') | *4 | —Cl | —$CH_3$ |
| 21 | —$C_2H_5$ | —$CH_3$ (2') | *4 | —H | —$NHCOCH_3$ |
| 22 | —$C_2H_4OCH_3$ | —$NHCOCH_3$ (2') | *4 | —Cl | —$CH_3$ |

Note)

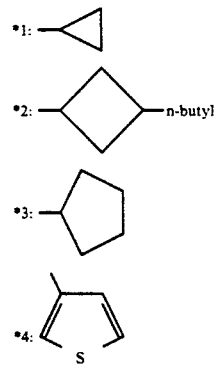

Then, the second aspect of the present invention will now be described in more detail with reference to a preferred embodiment.

The dye represented by the general formula (II) used in the present invention can be easily produced by a

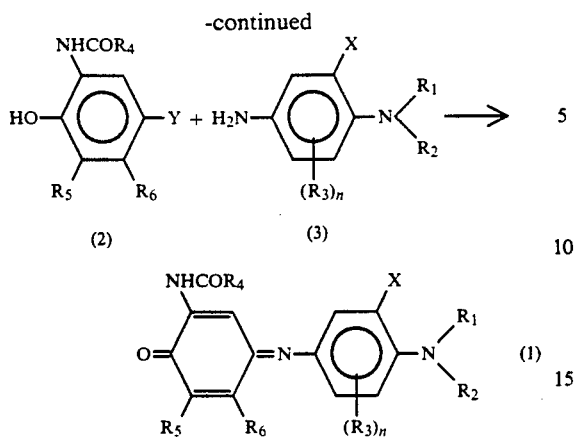

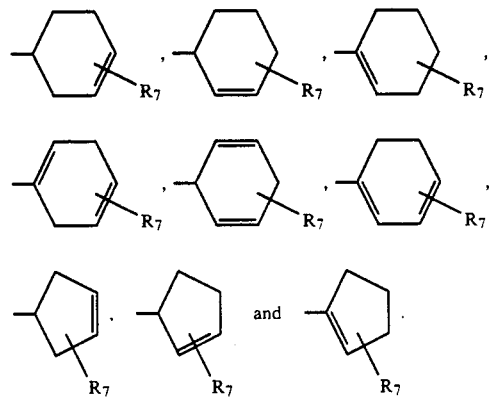

wherein $R_1$ to $R_6$ and X and n are as defined above and Y stands for a hydrogen atom or a halogen atom.

Preferred examples of the substituents represented by $R_1$ to $R_3$, $R_5$ and $R_6$ in the general formula (II) include alkyl groups such as a methyl group, an ethyl group, a propyl group or a butyl group; alkoxyalkyl groups such as a methoxyethyl group or an ethoxyethyl group; hydroxyalkyl groups such as a hydroxyethyl group and a β-hydroxypropyl group; halogenoalkyl groups such as a chloroethyl group; cyanoalkyl groups such as a cyanomethyl group or a cyanoethyl group; cycloalkyl groups such as a cyclohexyl group; aralkyl groups such as a benzyl group and a phenethyl group; aryl groups such as a phenyl group, a tolyl group, a halogenophenyl group and an alkoxyphenyl group; halogen atoms such as chlorine, bromine and iodine; a cyano group; alkoxy groups such as a methoxy group, an ethoxy group, a propoxy group and a butoxy group; acyl groups such as an acetyl group, a propanoyl group and a benzoyl group; acylamino groups such as an acetylamino group and a benzoylamino group; sulfonylamino groups such as a methanesulfonylamino group, an ethanesulfonylamino group and a benzenesulfonylamino group; ureido groups such as a methylureido group, 1,3-dimethylureido group and an ethylureido group; carbamoyl groups such as a methylcarbamoyl group, an ethyl carbamoyl group and a phenylcarbamoyl group; sulfamoyl groups such as a methylsulfamoyl group, an ethylsulfamoyl group and a phenylsulfamoyl group; and amino groups such as a methylamino group, an ethylamino group, a propylamino group, a dimethylamino group and a diethylamino group.

Examples of the $R_4$ include groups represented by the following formulae and their substituted derivatives.

wherein $R_7$ stands for a hydrogen atom; an alkyl group such as a methyl group, an ethyl group, a propyl group or a butyl group; or a halogen atom such as chlorine, bromine or iodine.

Preferred examples of the dye represented by the general formula (II) favorable in the present invention are given in the following Table B1. In the formulae, each $R_1$ stands for an ethyl group, each X stands for a hydrogen atom and each n is 1.

TABLE B1

| No. | $R_2$ | $R_3$ (position) | $R_4$ | $R_5$ | $R_6$ |
|---|---|---|---|---|---|
| 1 | —$C_2H_5$ | —$CH_3$ (2') | *1 | —Cl | —$CH_3$ |
| 2 | —$C_2H_4OH$ | —$CH_3$ (2') | *1 | —Cl | —$CH_3$ |
| 3 | —$C_2H_5$ | —$CH_3$ (2') | *1 | —H | —$NHCOCH_3$ |
| 4 | —$C_2H_5$ | —$OC_2H_5$ (2') | *1 | —H | —H |
| 5 | —$C_2H_5$ | —$CH_3$ (2') | *1 | —Cl | —$C_2H_5$ |
| 6 | —$C_2H_5$ | —$NHCOCH_3$ (2') | *1 | —Cl | —$CH_3$ |
| 7 | —$C_2H_4Cl$ | —$NHCONHCH_3$ (2') | *1 | —Cl | —$CH_3$ |
| 8 | —$C_2H_5$ | —$OC_2H_5$ (2') | *2 | —H | —H |
| 9 | —$C_2H_4OH$ | —$OC_2H_5$ (2') | *3 | —H | —$NHCOCH_3$ |
| 10 | —$C_2H_5$ | —$CH_3$ (2') | *4 | —Cl | —$CH_3$ |
| 11 | —$C_2H_5$ | —$NHCOCH_3$ (2') | *5 | —H | —H |
| 12 | —$CH_2Ph$ | —$OC_2H_5$ (2') | *6 | —H | —$NHCOCH_3$ |
| 13 | —$C_2H_4CN$ | —$NHSO_2CH_3$ (2') | *7 | —Cl | —$CH_3$ |
| 14 | —$C_2H_4NHSO_2CH_3$ | —$CH_3$ (2') | *7 | —H | —$NHSO_2CH_3$ |
| 15 | —Ph | —Cl (2') | *7 | —H | —$NHCONHCH_3$ |
| 16 | —$C_2H_5$ | —$CH_3$ (2') | *8 | —H | —$NHSO_2CH_3$ |
| 17 | —Ph | —Cl (2') | *9 | —H | —$NHCONHCH_3$ |
| 18 | —$C_2H_5$ | —H | *4 | —Cl | —$CH_3$ |
| 19 | —$C_2H_4OCH_3$ | —$NHCOCH_3$ (2') | *4 | —H | —$NHCOCH_3$ |
| 20 | —$C_2H_5$ | —$CH_3$ (2') | *4 | —H | —$NHCOCH_3$ |
| 21 | —$C_2H_4OH$ | —$CH_3$ (2') | *4 | —Cl | —$CH_3$ |
| 22 | —$C_2H_5$ | —$OC_2H_5$ (2') | *1 | —Cl | —$CH_3$ |
| 23 | —$C_2H_5$ | —$CH_3$ (2') | *1 | —H | —H |
| 24 | —$C_2H_4NHSO_2CH_3$ | —$CH_3$ (2') | *1 | —Cl | —$CH_3$ |
| 25 | —$C_2H_4OH$ | —$CH_3$ (2') | *10 | —Cl | —$NHCONHCH_3$ |
| 26 | —$C_2H_5$ | —$NHCOCH_3$ (2') | *10 | —H | —$C_2H_5$ |

TABLE B1-continued

| No. | $R_2$ | $R_3$ (position) | $R_4$ | $R_5$ | $R_6$ |
|---|---|---|---|---|---|
| 27 | $-C_2H_5$ | $-NHCOCH_3$ (2') | *10 | $-Cl$ | $-C_2H_5$ |

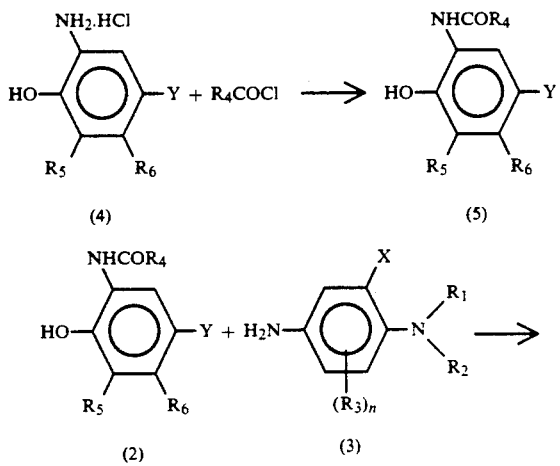

Then, the third aspect of the present invention will now be described in more detail with reference to a preferred embodiment.

The dye represented by the general formula (III) used in the present invention can be easily produced by a conventional method, for example, by coupling a compound represented by the general formula (2) with a p-phenylenediamine derivative represented by the general formula (3) in the presence of an oxidizing agent, such as silver chloride, ammonium persulfate or red prussiate, under an alkaline condition. The compound represented by the general formula (2) can be easily produced by a conventional method, for example, by subjecting an aminophenol compound represented by the general formula (4) and a carboxylic acid chloride compound represented by the general formula (5) to dehydrochlorination condensation.

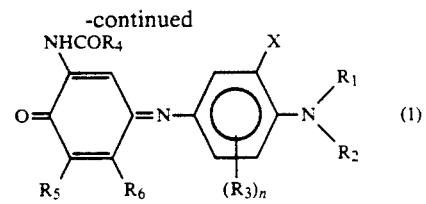

wherein $R_1$ to $R_6$ and X and n are as defined above and Y stands for a hydrogen atom or a halogen atom.

Preferred examples of the substituents represented by $R_1$ to $R_3$, $R_5$ and $R_6$ in the general formula (III) include alkyl groups such as a methyl group, an ethyl group, a propyl group and a butyl group; alkoxyalkyl groups such as a methoxyethyl group and an ethoxyethyl group; hydroxyalkyl groups such as a hydroxyethyl group and a β-hydroxypropyl group; halogenoalkyl groups such as a chloroethyl group; cyanoalkyl groups such as a cyanomethyl group and a cyanoethyl group; cycloalkyl groups such as a cyclohexyl group; aralkyl groups such as a benzyl group and a phenethyl group; aryl groups such as a phenyl group, a tolyl group, a halogenophenyl group and an alkoxyphenyl group; halogen atoms such as chlorine, bromine and iodine; a cyano group; alkoxy groups such as a methoxy group, an ethoxy group, a propoxy group and a butoxy group; acyl groups such as an acetyl group, a propanoyl group and a benzoyl group; acylamino groups such as an acetylamino group and a benzoylamino group; sulfonylamino groups such as a methanesulfonylamino group, an ethanesulfonylamino group and a benzenesulfonylamino group; ureido groups such as a methylureido group, 1,3-dimethylureido group and an ethylureido group; carbamoyl groups such as a methylcarbamoyl group, an ethyl carbamoyl group and a phenylcarbamoyl group; sulfamoyl groups such as a methylsulfamoyl group, an ethylsulfamoyl group and a phenylsulfamoyl group; and amino groups such as a methylamino group, an ethylamino group, a propylamino group, a dimethylamino group and a diethylamino group.

Examples of the $R_4$ include groups represented by the following formulae.

hydrogen atom and each n is 1 except for n in No. 19 which is 2.

TABLE C1

| No. | $R_2$ | $R_3$ (position) | $R_4$ | $R_5$ | $R_6$ |
|---|---|---|---|---|---|
| 1 | —$C_2H_5$ | —$CH_3$ (2') | *1 | —Cl | —$CH_3$ |
| 2 | —$C_2H_5$ | —$CH_3$ (2') | *1 | —H | —H |
| 3 | —$C_2H_4OH$ | —$CH_3$ (2') | *1 | —Cl | —$CH_3$ |
| 4 | —$C_2H_5$ | —$CH_3$ (2') | *1 | —H | —$NHCOCH_3$ |
| 5 | —$C_2H_5$ | —$OC_2H_5$ (2') | *1 | —H | —H |
| 6 | —$C_2H_5$ | —H | *1 | —Cl | —$CH_3$ |
| 7 | —$C_2H_5$ | —$CH_3$ (2') | *1 | —Cl | —$C_2H_5$ |
| 8 | —$C_2H_5$ | —$NHCOCH_3$ (2') | *1 | —Cl | —$CH_3$ |
| 9 | —$C_2H_4Cl$ | —$NHCONHCH_3$ (2') | *1 | —Cl | —$CH_3$ |
| 10 | —$C_2H_4OH$ | —$OC_2H_5$ (2') | *1 | —H | —$NHCOCH_3$ |
| 11 | —$C_2H_5$ | —$CH_3$ (2') | *2 | —Cl | —$CH_3$ |
| 12 | —$C_2H_5$ | —$NHCOCH_3$ (2') | *2 | —H | —H |
| 13 | —$CH_2Ph$ | —H | *2 | —H | —$NHCOCH_3$ |
| 14 | —$C_2H_4CN$ | —$NHSO_2CH_3$ (2') | *2 | —Cl | —$CH_3$ |
| 15 | —Ph | —Cl (2') | *2 | —H | —$NHCONHCH_3$ |
| 16 | —$C_2H_5$ | —$CH_3$ (2') | *3 | —Cl | —$CH_3$ |
| 17 | —$C_2H_4OC_2H_5$ | —$CH_3$ (2') | *3 | —Cl | —$CH_3$ |
| 18 | —$C_2H_5$ | —$CH_3$ (2') | *4 | —Cl | —$CH_3$ |
| 19 | —$C_2H_5$ | —$OC_2H_5$ (2', 5') | *4 | —Cl | —$CH_3$ |
| 20 | —$C_2H_5$ | —$CH_3$ (2') | *4 | —H | —$NHCOCH_3$ |
| 21 | —$C_2H_5$ | —$CH_3$ (2') | *5 | —Cl | —$CH_3$ |
| 22 | —$C_2H_5$ | —$CH_3$ (2') | *6 | —Cl | —$CH_3$ |
| 23 | —$C_2H_5$ | —$CH_3$ (2') | *6 | —H | —$NHCOCH_3$ |
| 24 | —$C_2H_5$ | —$CH_3$ (2') | *7 | —Cl | —$CH_3$ |
| 25 | —$C_2H_5$ | —$CH_3$ (2') | *8 | —Cl | —$CH_3$ |
| 26 | —$C_2H_5$ | —H | *9 | —Cl | —$CH_3$ |

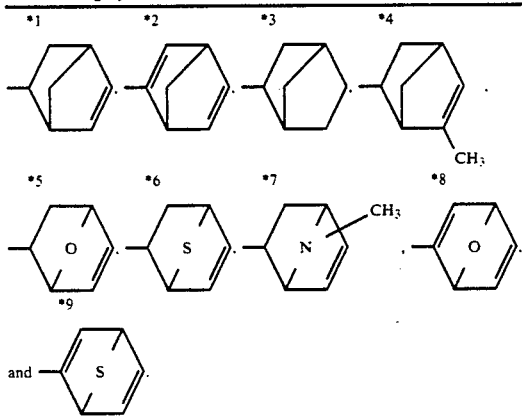

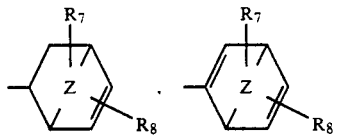

or

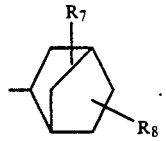

wherein $R_7$ and $R_8$ each stand for a hydrogen atom, a halogen atom such as chlorine, bromine or iodine or a lower alkyl group such as a methyl group, an ethyl group, a propyl group or a butyl group and Z stands for $CH_2$, O, S or $NR_9$ wherein $R_9$ stands for a hydrogen atom or a lower alkyl group such as a methyl group, an ethyl group, a propyl group or a butyl group.

Preferred examples of the dye represented by the general formula (III) favorable in the present invention are listed in the following Table C1. In the formulae, each $R_1$ stands for an ethyl group, each X stands for a The thermal transfer sheet of the present invention is characterized in that use is made of the above-described particular dyes. The other constitution may be the same as that in the conventional thermal transfer sheet.

The substrate sheet containing the above-described dye used in the thermal transfer sheet of the present invention may be any known one having a heat resistance and a strength to some extent. Examples of the substrate sheet include paper having a thickness in the range of from about 0.5 to 50 μm, preferably in the range of from about 3 to 10 μm, various types of converted paper, a polyester film, a polystyrene film, a polypropylene film, a polysulfone film, a polycarbonate film, an aramid film, a polyvinyl alcohol film and cellophane. A polyester film is particularly preferred.

The dye supporting layer provided on the surface of the above-described substrate sheet comprises a layer produced by supporting on the substrate sheet a dye selected from those represented by the general formulae (I) to (III) by means of an arbitrary resin.

The binder resin for supporting the above-described dye may be any conventional one, and preferred examples thereof include cellulose resins such as ethyl cellulose, hydroxyethyl cellulose, ethylhydroxy cellulose, hydroxypropyl cellulose, methyl cellulose, cellulose acetate and cellulose acetate butyrate, and vinyl resins such as polyvinyl alcohol, polyvinyl acetate, polyvinyl butyral, polyvinyl acetoacetal, polyvinyl pyrrolidone and polyacrylamide. Among them, polyvinyl butyral and polyvinyl acetal are particularly preferred from the viewpoint of the heat resistance and the migration of a dye.

The dye supporting layer of the thermal transfer sheet of the present invention is basically comprised of the above-described material and, if necessary, additionally contains various additives known in the art.

The above-described dye supporting layer is preferably formed by adding the above-described dye, binder resin and optional components to a suitable solvent to dissolve or disperse the individual components in the solvent to prepare a coating solution or an ink for the formation of a supporting layer, coating the coating solution or ink on the substrate sheet and drying the resultant coating.

The thickness of the supporting layer thus formed is in the range of from about 0.2 to 5.0 μm, preferably in the range of from about 0.4 to 2.0 μm. The content of the dye in the supporting layer is preferably 5 to 70% by weight, still preferably 10 to 60% by weight based on the weight of the supporting layer.

Although the thermal transfer sheet of the present invention, as such, is sufficiently useful for a thermal transfer application, it is also possible to further provide a surface tack eliminating layer, that is, a release layer, on the surface of the dye supporting layer. The provision of such a layer enables the tack adhesion of the thermal transfer sheet to the transfer material to be prevented during the thermal transfer, so that an image having a better density can be formed through the use of a higher thermal transfer temperature.

Regarding the release layer, a considerable effect can be attained by merely adhering an antitack inorganic powder. Further, for example, it is also possible to select a highly releasable resin, such as a silicone polymer, an acrylic polymer or a fluorinated polymer, and to provide a release layer of the selected resin having a thickness in the range of from 0.01 to 5 μm, preferably in the range of from 0.05 to 2 μm.

The inorganic powder or releasable polymer can exhibit a sufficient effect also when it is incorporated in the dye supporting layer.

Further, a heat resistant layer may be additionally provided on the back surface of the thermal transfer sheet for the purpose of preventing an adverse effect of heat from a thermal head.

The transfer material used for forming an image through the use of the above-described thermal transfer sheet may be any one as far as the recording face has a capability of accepting the above-described dye. When the transfer material is paper, a metal, glass, a synthetic resin or other material incapable of accepting the dye, a dye accepting layer may be formed on one surface of such a material.

Means for applying a thermal energy used in the thermal transfer through the use of the thermal transfer sheet according to the present invention and the recording material may be any means known in the art. For example, a desired object can be sufficiently attained by applying a thermal energy of about 5 to 100 mJ/mm$^2$ through the control of a recording time by means of a recording device, for example, a thermal printer (for example, a video printer VY-100 manufactured by Hitachi, Limited).

In particular, the thermal transfer sheet of the present invention can form a cyan image, and can be used in combination with thermal transfer sheets for yellow and magenta to provide a full color image having an excellent color producibility. A yellow dye represented by the following structural formula is particularly suitable as a dye for use in a thermal transfer sheet for yellow used in combination with the thermal transfer sheet of the present invention.

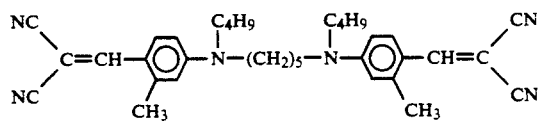

A magenta dye represented by the following structural formula is particularly suitable as a dye for use in a thermal transfer sheet for magenta used in combination with the thermal transfer sheet of the present invention.

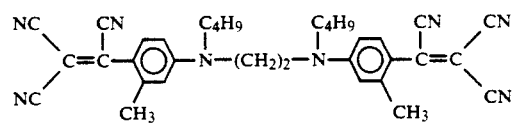

The present invention will now be described in more detail with reference to the following Reference Examples, Examples and Comparative Examples. "Parts" or "%" is by weight unless otherwise specified.

REFERENCE EXAMPLE A1

5 g of 2-cyclopropylcarbonylamino-4,6-dichloro5-methylphenol was dissolved in 115 ml of acetone, and a solution of 8.2 g of sodium carbonate in 60 ml of water and 5 g of 2-amino-5-diethylaminotoluene hydrochloride were added to the solution. A solution of 10.9 g of ammonium persulfate in 40 ml of water was dropwise added to the mixed solution at room temperature with stirring. After the completion of the dropwise addition, the mixture was allowed to react at room temperature for one hour. After the completion of the reaction, the precipitated crystal was collected by filtration and recrystallized from toluene to give 6.4 g (yield: 83.0%) of an indoaniline azomethine dye (dye No. 1 in Table A1) as an intended product. The melting point was 182.5° to 182.7° C. The maximum absorption wavelength of the product (in ethyl acetate) was 646 nm.

REFERENCE EXAMPLE A2

Dyes listed in Table A1 were prepared in the same manner as that of Reference Example A1, except that use was made of starting compounds corresponding to the dyes listed in Table A1.

EXAMPLE A1

An ink composition comprising the following components for the formation of a dye supporting layer was prepared, and the ink composition was coated on a 6 μm-thick polyethylene terephthalate film having a back surface subjected to tropicalization so that the coverage on a dry basis was 1.0 g/m$^2$. The resultant coating was dried to give the thermal transfer sheet of the present invention.

| Dye listed in Table A1 | 3 parts |
|---|---|
| Polyvinyl butyral | 4.5 parts |
| Methyl ethyl ketone | 46.25 parts |
| Toluene | 46.25 parts |

In the above-described composition, when the dye was insoluble, DMF, dioxane, chloroform or the like was properly used as a solvent. When the dye was not sufficiently dissolved in the solvent, use was made of the filtrate.

Then, synthetic paper (Yupo FPG #150 manufactured by Oji-Yuka Synthetic Paper Co., Ltd.) was used as the substrate sheet, and a coating solution having the following composition was coated on one surface of the synthetic paper so that the coverage on a dry basis was 10.0 g/m². The resultant coating was dried at 100° C. for 30 min to give a thermal transfer sheet.

| Polyester resin (Vylon 200 manufactured by Toyobo Co., Ltd.) | 11.5 parts |
|---|---|
| Vinyl chloride/vinyl acetate copolymer (VYHH manufactured by UCC) | 5.0 parts |
| Amino modified silicone (KF-393 (manufactured by The Shin-Etsu Chemical Co., Ltd.) | 1.2 parts |
| Epoxy modified silicone (X-22-343 (manufactured by The Shin-Etsu Chemical Co., Ltd.) | 1.2 parts |
| Methyl ethyl ketone/toluene/cyclohexanone (weight ratio of 4:4:2) | 102.0 parts |

The above-described thermal transfer sheet of the present invention and the above-described transfer material were put on top of each other in such a manner that the dye supporting layer and the dye accepting surface faced each other. Recording was conducted by means of a thermal head from the back surface of the thermal transfer sheet under conditions of a head applied voltage of 10 V and a setting time of 4.0 msec. The results are given in the following Table A2.

TABLE A2

| Dye No. | Dye migration resistance | Recording density | Light fastness | Color tone |
|---|---|---|---|---|
| 1 | △ | 1.95 | ○ | blue |
| 2 | ○ | 1.91 | ○ | blue |
| 3 | ○ | 1.92 | ○ | blue |
| 4 | △ | 1.97 | ○ | blue |
| 5 | ○ | 1.81 | ○ | blue |
| 6 | ○ | 1.82 | ○ | blue |
| 7 | ○ | 1.79 | ○ | blue |
| 8 | ○ | 1.85 | ○ | blue |
| 9 | △ | 1.93 | ○ | blue |
| 10 | ○ | 1.88 | ○ | blue |
| 11 | ○ | 1.98 | ○ | blue |
| 12 | ○ | 1.83 | ○ | blue |
| 13 | ○ | 1.86 | ○ | blue |
| 14 | ○ | 1.85 | ○ | blue |
| 15 | ○ | 1.82 | ○ | blue |
| 16 | ○ | 1.73 | ○ | blue |
| 17 | ○ | 1.90 | ○ | blue |
| 18 | ○ | 1.70 | ○ | blue |
| 19 | ○ | 1.83 | ○ | blue |
| 20 | ○ | 1.72 | ○ | blue |
| 21 | ○ | 1.76 | ○ | blue |
| 22 | ○ | 1.71 | ○ | blue |

COMPARATIVE EXAMPLES A1 TO A6

The procedure of Example A1 was repeated, except that dyes listed in the following Table 3 were used instead of the dyes used in Example A1. The results are given in the following Table A3.

TABLE A3

| Comp. Ex. No. | Dye migration resistance | Recording density | Light fastness | Color tone |
|---|---|---|---|---|
| A1 | X | 1.01 | △ | blue |
| A2 | △ | 1.15 | △ | blue |
| A3 | X | 2.13 | △ | blue |
| A4 | △ | 1.25 | △ | blue |
| A5 | X | 1.05 | △ | indigo |
| A6 | △ | 1.87 | ○ | blue |

Note)
Comp. Ex. A1 = C.I. Disperse Blue 14
Comp. Ex. A2 = C.I. Disperse Blue 134
Comp. Ex. A3 = C.I. Solvent Blue 63
Comp. Ex. A4 = C.I. Disperse Blue 26
Comp. Ex. A5 = C.I. Disperse Violet 4
Comparative Example A6:

[structure: quinone-imine dye with NHCOPh, Cl, CH₃, CH₃ substituents and N(C₂H₅)₂ group]

The above-described recording density is a value measured by densitometer RD-918 manufactured by Macbeth, U.S.A.

With respect to the dye migration resistance, the recorded image was allowed to stand in an atmosphere of 70° C. for 48 hr. When no change in the sharpness was observed and rubbing of the surface with white paper gave rise to no coloration of the white paper, the dye migration resistance was evaluated as ⊙; when the sharpness of the image was slightly lost and the white paper was slightly colored, the dye migration resistance was evaluated as ○; when the sharpness of the image was lost and the white paper was colored, the dye migration resistance was evaluated as △; and when the image became unclear and the white paper was remarkably colored, the dye migration resistance was evaluated as X.

The light fastness test was conducted as follows.

Irradiation was conducted by means of a xenon fadeometer Ci35A (manufactured by Atlas) under conditions of a black panel temperature of 50° C. and an integrating irradiation energy of 70 kJ/m².

The percentage fading was determined from a density change around an initial density of 1.0 according to the following equation.

$$\text{Percentage fading} = (1 - I/I_0) \times 100 \, (\%)$$

wherein
$I$ = optical density after irradiation; and
$I_0$ = optical density before irradiation.
○: less than 20% in the percentage fading
X : 20% or more in the percentage fading As described above, according to the present invention, the use of a dye having a particular structure enables the dye used to easily migrate to a transfer material upon being exposed to a heat energy even in a very short time, so that it becomes possible to provide a thermal transfer sheet capable of providing a recorded image having a high density and excellent various types of fastness, particularly excellent dye migration resistance and light fastness.

REFERENCE EXAMPLE B1

3 g of 2-(3-cyclohexenyl)carbonylamino-4,6-dichloro-5-nethylphenol was dissolved in 300 ml of ethanol and 300 ml of ethyl acetate, and a solution of 7.3 g of sodium carbonate in 100 ml of water and a solution of 3.4 g of 2-amino-5-diethylaminotoluene in 35 ml of water were added to the solution. A solution of 7.5 g of ammonium persulfate in 150 ml of water was dropwise added to the mixed solution at room temperature with stirring. After the completion of the dropwise addition, the mixture was allowed to react at room temperature for one hour. After the completion of the reaction, the precipitated crystal was collected by filtration and recrystallized from a toluene/methanol mixed solvent to give 4.9 g (yield: 85.0%) of an indoaniline azomethine dye (dye No. 1 in Table B1) as an intended product. The melting point was 166.5° to 167.4° C. The maximum absorption wavelength of the product (in ethyl acetate) was 647 nm.

REFERENCE EXAMPLE B2

Dyes listed in Table B1 were prepared in the same manner as that of Reference Example B1, except that use was made of starting compounds corresponding to the dyes listed in Table B1.

EXAMPLE B1

An ink composition comprising the following components for the formation of a dye supporting layer was prepared, and the ink composition was coated on a 6 μm-thick polyethylene terephthalate film having a back surface subjected to tropicalization so that the coverage on a dry basis was 1.0 g/m². The resultant coating was dried to give the thermal transfer sheet of the present invention.

| Dye listed in Table B1 | 3 parts |
| Polyvinyl butyral | 4.5 parts |
| Methyl ethyl ketone | 46.25 parts |
| Toluene | 46.25 parts |

In the above-described composition, when the dye was insoluble, DMF, dioxane, chloroform or the like was properly used as a solvent. When the dye was not sufficiently dissolved in the solvent, use was made of the filtrate.

Then, synthetic paper (Yupo FPG #150 manufactured by Oji-Yuka Synthetic Paper Co., Ltd.) was used as the substrate sheet, and a coating solution having the following composition was coated on one surface of the synthetic paper so that the coverage on a dry basis was 10.0 g/m². The resultant coating was dried at 100° C. for 30 min to give a thermal transfer sheet.

| Polyester resin (Vylon 200 manufactured by Toyobo Co., Ltd.) | 11.5 parts |
| Vinyl chloride/vinyl acetate copolymer (VYHH manufactured by UCC) | 5.0 parts |
| Amino modified silicone (KF-393 (manufactured by The Shin-Etsu Chemical Co., Ltd.) | 1.2 parts |
| Epoxy modified silicone (X-22-343 (manufactured by The Shin-Etsu Chemical Co., Ltd.) | 1.2 parts |
| Methyl ethyl ketone/toluene/cyclohexanone (weight ratio of 4:4:2) | 102.0 parts |

The above-described thermal transfer sheet of the present invention and the above-described transfer material were put on top of the other in such a manner that the dye supporting layer and the dye accepting surface faced each other. Recording was conducted by means of a thermal head from the back surface of the thermal transfer sheet under conditions of a head applied voltage of 10 V and a setting time of 4.0 msec. The results are given in the following Table B2.

TABLE B2

| Dye No. | Dye migration resistance | Recording density | Light fastness | Color tone |
|---|---|---|---|---|
| 1 | ○ | 1.83 | ○ | blue |
| 2 | ○ | 1.80 | ○ | blue |
| 3 | ○ | 1.86 | ○ | blue |
| 4 | ○ | 1.89 | ○ | blue |
| 5 | ○ | 1.84 | ○ | blue |
| 6 | ○ | 1.72 | ○ | blue |
| 7 | ○ | 1.67 | ○ | blue |
| 8 | ○ | 1.77 | ○ | blue |
| 9 | ○ | 1.72 | ○ | blue |
| 10 | ○ | 1.88 | ○ | blue |
| 11 | ○ | 1.86 | ○ | blue |
| 12 | ○ | 1.69 | ○ | blue |
| 13 | ○ | 1.67 | ○ | blue |
| 14 | ○ | 1.65 | ○ | blue |
| 15 | ○ | 1.70 | ○ | blue |
| 16 | ○ | 1.78 | ○ | blue |
| 17 | ○ | 1.64 | ○ | blue |
| 18 | ○ | 1.84 | ○ | blue |
| 19 | ○ | 1.66 | ○ | blue |
| 20 | ○ | 1.82 | ○ | blue |
| 21 | ○ | 1.83 | ○ | blue |
| 22 | ○ | 1.66 | ○ | blue |
| 23 | △ | 1.92 | ○ | blue |
| 24 | ○ | 1.60 | ○ | blue |
| 25 | ○ | 1.82 | ○ | blue |
| 26 | ○ | 1.72 | ○ | blue |
| 27 | ○ | 1.66 | ○ | blue |

COMPARATIVE EXAMPLES B1 TO B6

The procedure of Example B1 was repeated, except that dyes listed in the following Table B3 were used instead of the dyes used in Example B1. The results are given in the following Table B3.

TABLE B3

| Comp. Ex. No. | Dye migration resistance | Recording density | Light fastness | Color tone |
|---|---|---|---|---|
| B1 | X | 1.01 | △ | blue |
| B2 | △ | 1.15 | △ | blue |
| B3 | X | 2.13 | △ | blue |
| B4 | △ | 1.25 | △ | blue |
| B5 | X | 1.05 | △ | indigo |
| B6 | △ | 1.87 | ○ | blue |

Note)
Comp. Ex. B1 = C.I. Disperse Blue 14
Comp. Ex. B2 = C.I. Disperse Blue 134
Comp. Ex. B3 = C.I. Solvent Blue 63
Comp. Ex. B4 = C.I. Disperse Blue 26
Comp. Ex. B5 = C.I. Disperse Violet 4
Comparative Example B6:

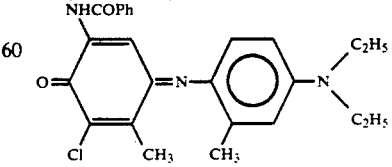

The above-described recording density is a value measured by densitometer RD-918 manufactured by Macbeth, U.S.A.

With respect to the dye migration resistance, the recorded image was allowed to stand in an atmosphere of 70° C. for 48 hr. When no change in the sharpness was observed and rubbing of the surface with white paper gave rise to no coloration of the white paper, the dye migration resistance was evaluated as ⊚; when the sharpness of the image was slightly lost and the white paper was slightly colored, the dye migration resistance was evaluated as ○; when the sharpness of the image was lost and the white paper was colored, the dye migration resistance was evaluated as Δ; and when the image became unclear and the white paper was remarkably colored, the dye migration resistance was evaluated as X.

The light fastness test was conducted as follows.

Irradiation was conducted by means of a xenon fadeometer Ci35A (manufactured by Atlas) under conditions of a black panel temperature of 50° C. and an integrating irradiation energy of 70 kJ/m$^2$.

The percentage fading was determined from a density change around an initial density of 1.0 according to the following equation.

Percentage fading = $(1 - I/I_0) \times 100$ (%)

wherein

I = optical density after irradiation; and
I$_0$ = optical density before irradiation.
○: less than 20% in the percentage fading
X : 20% or more in the percentage fading As described above, according to the present invention, the use of a dye having a particular structure enables the dye used to easily migrate to a transfer material upon being exposed to a heat energy even in a very short time, so that it becomes possible to provide a thermal transfer sheet capable of providing a recorded image having a high density and excellent various types of fastness, particularly excellent dye migration resistance and light fastness.

REFERENCE EXAMPLE C1

(1) Production of 5-bicyclo[2,2,1]heptene-2-carboxylic acid:

49.5 g of acrylic acid was added to 49.9 g of cyclopentadiene and 40 ml of diethyl ether, and a reaction was allowed to react at room temperature for 2 hr with stirring. After the completion of the reaction, the reaction mixture was concentrated and purified by distillation to give 78.0 g (yield: 82%) of an intended product.

(2) Production of 2-(5-bicyclo[2,2,1]heptenyl) carbonylamino-4,6-dichloro-5-methylphenol 20.0 g of 5 bicyclo[2,2,1]heptene 2 carboxylic acid was added to 96.4 g of thionyl chloride, and the mixture was heated under reflux for 2 hr to conduct a reaction. After the completion of the reaction, the reaction mixture was concentrated to remove thionyl chloride. 180 ml of dimethyl acetamide was added thereto, 29.8 g of 2-amino-4,6-dichloro-5-methylphenol hydrochloride was added thereto, and the mixture was allowed to react at 15° C. or below for one hour. After the completion of the reaction, an intended product was extracted with chloroform, and the extract was concentrated to dryness to give a crude product. The crude product was purified by column chromatography to give 37.7 g (yield: 93%) of an intended product.

(3) Production of Dye 14.2 g of 2-(5-bicyclo[2,2,1]heptenyl) carbonylamino-4,6-dichloro-5-methylphenol was dissolved in 540 ml of ethanol and 540 ml of ethyl acetate, and a solution of 25.2 g of sodium carbonate in 150 ml of water and a solution of 11.7 g of 2-amino-5-diethylaminotoluene in 150 ml of water were added to the solution. A solution of 26 g of ammonium persulfate in 230 ml of water was dropwise added to the mixed solution at room temperature with stirring. After the completion of the dropwise addition, the mixture was allowed to react at room temperature for one hour. After the completion of the reaction, the ethyl acetate layer was concentrated to give a crude dye. The crude dye was purified by column chromatography to give 5.4 g (yield: 26.0%) of an indoaniline azomethine dye (dye No. 1 in Table 1) as an intended product. The melting point was 157.4° to 158.6° C. The maximum absorption wavelength of the product (in ethyl acetate) was 647 nm.

REFERENCE EXAMPLE C2

Dyes listed in Table C1 were prepared in the same manner as that of Reference Example C1, except that use was made of starting compounds corresponding to the dyes listed in Table C1.

EXAMPLE C1

An ink composition comprising the following components for the formation of a dye supporting layer was prepared, and the ink composition was coated on a 6 μ-thick polyethylene terephthalate film having a back surface subjected to tropicalization so that the coverage on a dry basis was 1.0 g/m$^2$. The resultant coating was dried to give the thermal transfer sheet of the present invention.

| Dye listed in Table C1 | 3 parts |
| --- | --- |
| Polyvinyl butyral resin | 4.5 parts |
| Methyl ethyl ketone | 46.25 parts |
| Toluene | 46.25 parts |

In the above-described composition, when the dye was insoluble, DMF, dioxane, chloroform or the like was properly used as a solvent. When the dye was not sufficiently dissolved in the solvent, use was made of the filtrate.

Then, synthetic paper (Yupo FPG #150 manufactured by Oji-Yuka Synthetic Paper Co., Ltd.) was used as the substrate sheet, and a coating solution having the following composition was coated on one surface of the synthetic paper so that the coverage on a dry basis was 10.0 g/m$^2$. The resultant coating was dried at 100° C. for 30 min to give a thermal transfer sheet.

| Polyester resin (Vylon 200 manufactured by Toyobo Co., Ltd.) | 11.5 parts |
| --- | --- |
| Vinyl chloride/vinyl acetate copolymer (VYHH manufactured by UCC) | 5.0 parts |
| Amino modified silicone (KF-393 (manufactured by The Shin-Etsu Chemical Co., Ltd.) | 1.2 parts |
| Epoxy modified silicone (X-22-343 (manufactured by The Shin-Etsu Chemical Co., Ltd.) | 1.2 parts |
| Methyl ethyl ketone/toluene/cyclohexanone (weight ratio of 4:4:2) | 102.0 parts |

The above-described thermal transfer sheet of the present invention and the above-descried transfer material were put on top of each other in such a manner that the dye supporting layer and the dye accepting surface faced each other. Recording was conducted by means of a thermal head from the back surface of the thermal transfer sheet under conditions of a head applied voltage of 10 V and a setting time of 4.0 msec. The results are given in the following Table C2.

TABLE C2

| Dye No. | Dye migration resistance | Recording Light density | Color fastness | tone |
|---|---|---|---|---|
| 1 | ◎ | 1.78 | ◎ | blue |
| 2 | Δ | 1.86 | ◎ | blue |
| 3 | ◎ | 1.77 | ◎ | blue |
| 4 | ◎ | 1.77 | ◎ | blue |
| 5 | ◎ | 1.80 | ◎ | blue |
| 6 | ◎ | 1.82 | ◎ | blue |
| 7 | ◎ | 1.76 | ◎ | blue |
| 8 | ◎ | 1.72 | ◎ | blue |
| 9 | ◎ | 1.66 | ◎ | blue |
| 10 | ◎ | 1.70 | ◎ | blue |
| 11 | ◎ | 1.75 | ◎ | blue |
| 12 | ◎ | 1.74 | ◎ | blue |
| 13 | ◎ | 1.71 | ◎ | blue |
| 14 | ◎ | 1.61 | ◎ | blue |
| 15 | ◎ | 1.62 | ◎ | blue |
| 16 | ◎ | 1.77 | ◎ | blue |
| 17 | ◎ | 1.72 | ◎ | blue |
| 18 | ◎ | 1.79 | ◎ | blue |
| 19 | ◎ | 1.63 | ◎ | blue |
| 20 | ◎ | 1.78 | ◎ | blue |
| 21 | ○ | 1.79 | ◎ | blue |
| 22 | ○ | 1.71 | ◎ | blue |
| 23 | ○ | 1.70 | ◎ | blue |
| 24 | ○ | 1.73 | ◎ | blue |
| 25 | ○ | 1.75 | ◎ | blue |
| 26 | ○ | 1.75 | ○ | blue |

COMPARATIVE EXAMPLES 21 TO 26

The procedure of Example C1 was repeated, except that dyes listed in the following Table C3 were used instead of the dyes used in Example C1. The results are given in the following Table C3.

TABLE C

| Comp. Ex. No. | Dye migration resistance | Recording density | Light fastness | Color tone |
|---|---|---|---|---|
| 1 | X | 1.01 | Δ | blue |
| 2 | Δ | 1.15 | Δ | blue |
| 3 | X | 2.13 | Δ | blue |
| 4 | Δ | 1.25 | Δ | blue |
| 5 | X | 1.05 | Δ | indigo |
| 6 | Δ | 1.87 | ○ | blue |

Note)
Comp. Ex. C1 = C.I. Disperse Blue 14
Comp. Ex. C2 = C.I. Disperse Blue 134
Comp. Ex. C3 = C.I. Solvent Blue 63
Comp. Ex. C4 = C.I. Disperse Blue 26
Comp. Ex. C5 = C.I. Disperse Violet 4
Comparative Example C6:

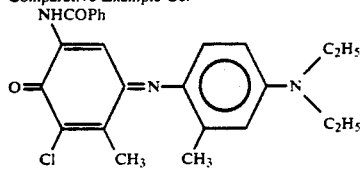

The above-described recording density is a value measured by densitometer RD-918 manufactured by Macbeth, U.S.A.

With respect to the dye migration resistance, the recorded image was allowed to stand in an atmosphere of 70° C. for 48 hr. When no change in the sharpness was observed and rubbing of the surface with white paper gave rise to no coloration of the white paper, the dye migration resistance was evaluated as ◎; when the sharpness of the image was slightly lost and the white paper was slightly colored, the dye migration resistance was evaluated as ○; when the sharpness of the image was lost and the white paper was colored, the dye migration resistance was evaluated as Δ; and when the image became unclear and the white paper was remarkably colored, the dye migration resistance was evaluated as X.

The light fastness test was conducted as follows. Irradiation was conducted by means of a xenon fadeometer Ci35A (manufactured by Atlas) under conditions of a black panel temperature of 50° C. and an integrating irradiation energy of 70 kJ/m$^2$.

The percentage fading was determined from a density change around an initial density of 1.0 according to the following equation.

$$\text{Percentage fading} = (1 - I/I_0) \times 100 \, (\%)$$

wherein
 $I$ = optical density after irradiation; and
 $I_0$ = optical density before irradiation.
 ○: less than 20% in the percentage fading
 X : 20% or more in the percentage fading As described above, according to the present invention, the use of a dye having a particular structure enables the dye used to easily migrate to a transfer material upon being exposed to a heat energy even in a very short time, so that it becomes possible to provide a thermal transfer sheet capable of providing a recorded image having a high density and excellent various types of fastness, particularly excellent dye migration resistance and light fastness.

EXAMPLE D1, COMPARATIVE EXAMPLES D1 and D2

The following ink composition for the formation of a dye supporting layer was prepared and heated to 70° C. to completely dissolve the ink.

| | |
|---|---|
| Dye | 9 parts |
| Polyvinyl acetoacetal (KS-1) (Sekisui Chemical Co., Ltd.) | 6 parts |
| Toluene | 42.5 parts |
| Methyl ethyl ketone | 42.5 parts |

The ink composition was allowed to stand at room temperature (20°±3° C.) for 48 hr and then subjected to an ink stability test where the precipitation of the dye in the ink was observed with the naked eye.

The ink composition was coated on a 6 μm-thick polyethylene terephthalate film having a back surface subjected to tropicalization so that the coverage on a dry basis was 1.25 g/m$^2$. The resultant coating was dried to give the thermal transfer sheet of the present invention.

Dyes used in Example D1 and Comparative Examples D1 and D2 are listed in the following Table D1.

The state of the surface of the dye supporting layer of the resultant transfer sheets was observed with the naked eye to examine the surface gloss, bleed-out of dye and crystallization of dye.

Then, synthetic paper (Yupo FPG-150 having a thickness of 150 μm manufactured by Oji-Yuka Synthetic Paper Co., Ltd.) was used as the substrate sheet, and a coating solution having the following composition was coated on one surface of the synthetic paper by means of a bar coater so that the coverage on a dry basis was 5.0 g/m². The resultant coating was immediately dried simply by a drier, and then dried in an oven at 80° C. for 5 min to give a thermal transfer image receiving sheet.

| | |
|---|---|
| Polyester resin (Vylon 600 manufactured by Toyobo Co., Ltd.) | 4.0 parts |
| Vinyl chloride/vinyl acetate copolymer (#1000A manufactured by Denki Kagaku Kogyo K.K.) | 6.0 parts |
| Amino modified silicone (X-22-3050 (manufactured by The Shin-Etsu Chemical Co., Ltd.) | 0.2 parts |
| Epoxy modified silicone (X-22-3000E (manufactured by The Shin-Etsu Chemical Co., Ltd.) | 0.2 parts |
| Methyl ethyl ketone/toluene/cyclohexanone (weight ratio of 1/1) | 89.6 parts |

The above-described thermal transfer sheet of the present invention and the above-described transfer material were put on top of each other in such a manner that the dye supporting layer and the dye accepting surface faced each other. Recording was conducted by means of a thermal head (KMT-85-6MPD-HTV; resistance 500 Ω) from the back surface of the thermal transfer sheet under conditions of a head applied voltage of 10.5 V and a maximum pulse width of 16 msec. The results are given in the following Table C2.

The reflection density of the resultant print was measured by means of a densitometer TR-310 (status A filter) manufactured by X-Rite.

Ames test was conducted as a mutagenic test.

Strains used were S. typhimurium TA100, TA98 and TA1538.

When the increase in the reversion colony was twice or more as compared with that in the case of the control, the mutagenicity was judged as positive, while when the increase in the reversion colony was less than twice as compared with that in the case of the control, the mutagenicity was judged as negative.

With respect to the dye migration resistance, the recorded image was allowed to stand in an atmosphere of 70° C. for 48 hr. When no change in the sharpness was observed and rubbing of the surface with white paper gave rise to no coloration of the white paper, the dye migration resistance was evaluated as ⊚; when the sharpness of the image was slightly lost and the white paper was slightly colored, the dye migration resistance was evaluated as ○; when the sharpness of the image was lost and the white paper was colored, the dye migration resistance was evaluated as Δ; and when the image became unclear and the white paper was remarkably colored, the dye migration resistance was evaluated as X.

The light fastness test was conducted as follows.

Irradiation was conducted by means of a xenon fadeometer Ci35A (manufactured by Atlas) under conditions of a black panel temperature of 50° C. and an integrating irradiation energy of 70 kJ/m².

The percentage fading was determined from a density change around an initial density of 1.0 according to the following equation.

Percentage fading = $(1 - I/I_0) \times 100$ (%)

wherein
I = optical density after irradiation; and
$I_0$ = optical density before irradiation.
○: less than 20% in the percentage fading
Δ: 20% or more in the percentage fading

TABLE D1

| | Ex. D1 | Comp. Ex. D1 | Comp. Ex. D2 |
|---|---|---|---|
| physical properties | 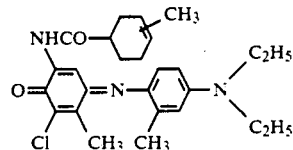 | 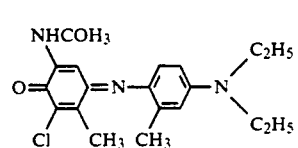 | 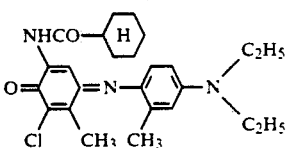 |
| color tone | blue | blue | blue |
| stability of ink | completely dissolved | large amount of crystal precipitated | small amount of crystal precipitated |
| surface appearance of sheet | glossy surface | rough surface due to undissolved dye | rough surface due to undissolved dye |
| dye migration resistance | ○ | X | Δ |
| recording density | 2.19 | 1.85 | 2.07 |
| light fastness | ○ | ○ | ○ |
| mutagenicity | negative | positive | negative |

We claim:

1. A thermal transfer sheet comprising:
    a substrate sheet; and
    a dye supporting layer formed on one surface of said substrate sheet and comprising a dye, represented by the following general formula (I)

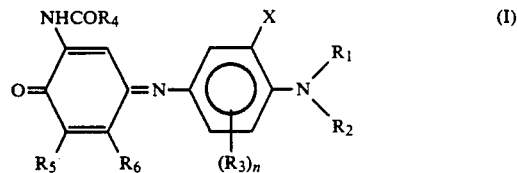

wherein $R_1$ stands for a substituted or unsubstituted alkyl group, cycloalkyl group, aralkyl group or aryl group or an atom or atom group which combines with X to form a five- or six-membered ring; $R_2$ stands for a substituted or unsubstituted alkyl group, a cycloalkyl group, an aralkyl group or an aryl group, provided that $R_1$ and $R_2$ may combine with each other to form a five- or six-membered ring which may have an oxygen or nitrogen atom;

$R_3$ stands for a hydrogen atom, a halogen atom, a cyano group, a substituted or unsubstituted alkyl group, cycloalkyl group, alkoxy group, aralkyl group, aryl group, acyl group, acylamino group, sulfonylamino group, ureido group, carbamoyl group, sulfamoyl group or amino group;

$R_4$ stands for a substituted or unsubstituted thienyl group bonded at the $\beta$-position;

$R_5$ and $R_6$ which may be the same or different stand for a hydrogen atom, a halogen atom, a substituted or unsubstituted alkyl group, alkoxy group, acylamino group, sulfonylamino group or ureido group;

X stands for a hydrogen atom or an atom or atom group which combines with $R_1$ to form a five- or six-membered ring; and n is 1 or 2.

2. A thermal transfer sheet comprising:
a substrate sheet; and
a dye supporting layer formed on one surface of said substrate sheet and comprising a dye, represented by the following general formula (II)

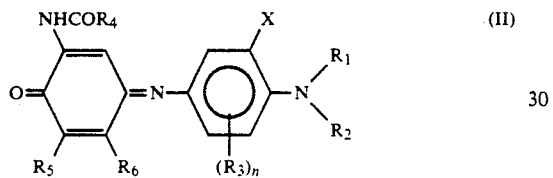
(II)

wherein $R_1$ stands for a substituted or unsubstituted alkyl group, cycloalkyl group, aralkyl group or aryl group or an atom or atom group which combines with X to form a five- or six-membered ring;

$R_2$ stands for a substituted or unsubstituted alkyl group, a cycloalkyl group, an aralkyl group or an aryl group, provided that $R_1$ and $R_2$ may combine with each other to form a five- or six-membered ring which may have an oxygen or nitrogen atom;

$R_3$ stands for a hydrogen atom, a halogen atom, a cyano group, a substituted or unsubstituted alkyl group, cycloalkyl group, alkoxy group, aralkyl group, aryl group, acyl group, acylamino group, sulfonylamino group, ureido group, carbamoyl group, sulfamoyl group, or amino group;

$R_4$ stands for a substituted or unsubstituted five- or six-membered cycloalkenyl group;

$R_5$ and $R_6$ which may be the same or different stand for a hydrogen atom, a halogen atom, a substituted or unsubstituted alkyl group, alkoxy group, acylamino group, sulfonylamino group or ureido group;

X stands for a hydrogen atom or an atom or atom group which combines with $R_1$ to form a five- or six-membered ring; and n is 1 or 2.

3. A thermal transfer sheet comprising:
a substrate sheet; and
a dye supporting layer formed on one surface of said substrate sheet and comprising a dye, represented by the following general formula (III)

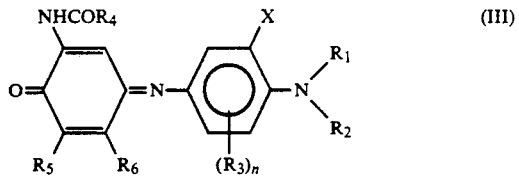
(III)

wherein $R_1$ stands for a substituted or unsubstituted alkyl group, cycloalkyl group, aralkyl group or aryl group or an atom or atom group which combines with X to form a five- or six-membered ring;

$R_2$ stands for a substituted or unsubstituted alkyl group, a cycloalkyl group, an aralkyl group or an aryl group, provided that $R_1$ and $R_2$ may combine with each other to form a five- or six-membered ring which may have an oxygen or nitrogen atom;

$R_3$ stands for a hydrogen atom, a halogen atom, a cyano group, a substituted or unsubstituted alkyl group, cycloalkyl group, alkoxy group, aralkyl group, aryl group, acyl group, acylamino group, sulfonylamino group, ureido group, carbamoyl group, sulfamoyl group, or amino group;

$R_4$ stands for a group represented by the following formula

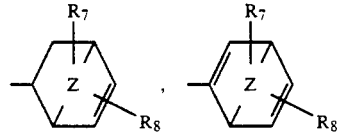

or

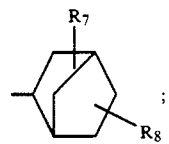
;

$R_5$ and $R_6$ which may be the same or different stand for a hydrogen atom, a halogen atom, a substituted or unsubstituted alkyl group, alkoxy group, acylamino group, sulfonylamino group or ureido group;

X stands for a hydrogen atom or an atom or atom group which combines with $R_1$ to form a five- or six-membered ring; n is 1 or 2;

$R_7$ and $R_8$ stand for a hydrogen atom, a halogen atom or a lower alkyl group;

Z stand for $CH_2$, O, S or $NR_9$; and $R_9$ stands for a hydrogen atom or a lower alkyl group.

* * * * *